US012746823B2

(12) United States Patent
Neuman et al.

(10) Patent No.: US 12,746,823 B2
(45) Date of Patent: Sep. 29, 2026

(54) RECHARGEABLE ENERGY STORAGE SYSTEM ISOLATION DETECTION

(71) Applicant: GM GLOBAL TECHNOLOGY OPERATIONS LLC, Detroit, MI (US)

(72) Inventors: Christopher R. Neuman, Denver, CO (US); Gautam Kulkarni, Rocheseter, MI (US); Chaitanya Sankavaram, Rochester Hills, MI (US); James Routh, Oak Ridge, TN (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 18/530,475

(22) Filed: Dec. 6, 2023

(65) Prior Publication Data

US 2025/0187443 A1 Jun. 12, 2025

(51) Int. Cl.
*B60L 3/00* (2019.01)

(52) U.S. Cl.
CPC ......... *B60L 3/0046* (2013.01); *B60L 2250/10* (2013.01)

(58) Field of Classification Search
CPC ... B60L 3/0046; B60L 2250/10; G01R 31/12; G01R 31/392; G01R 31/36
See application file for complete search history.

(56) References Cited

U.S. PATENT DOCUMENTS 9,046,559 B2 * 6/2015 Lindsay .................... B60L 3/04
9,954,259 B1 * 4/2018 Grace ..................... B60L 58/26
10,126,372 B2 * 11/2018 Eifert ................... G01R 31/374
10,381,692 B2 * 8/2019 Eifert .................... B60L 3/0046
11,762,028 B2 9/2023 Sankavaram et al.
11,796,602 B2 * 10/2023 Sudarsan ............. G01R 31/392
12,100,868 B1 * 9/2024 Kurtulus .............. G01R 31/392
2011/0148428 A1 * 6/2011 Lasson ................... G01R 27/18 324/509
2013/0049971 A1 * 2/2013 Hermann .............. B60L 3/0046 374/45
2015/0008929 A1 * 1/2015 Ehrmann .............. B60L 3/0046 324/426
2018/0040921 A1 * 2/2018 Huber .................. G01R 31/392
2019/0111800 A1 * 4/2019 Remboski .......... G01R 31/3648
2023/0109419 A1 * 4/2023 Tian ..................... G01R 31/392 702/63
2023/0133482 A1 * 5/2023 Sankavaram ........... B60L 58/10 701/22
2023/0137625 A1 5/2023 Sankavaram et al.
(Continued)

FOREIGN PATENT DOCUMENTS

CN 117154249 A 12/2023

*Primary Examiner* — Frederick M Brushaber
(74) *Attorney, Agent, or Firm* — Quinn IP Law

(57) ABSTRACT

An assessment for loss of isolation in a rechargeable energy storage systems (RESS). The assessment may include collecting isolation resistance data for a plurality of RESSs operating onboard a fleet of vehicles, applying statistical methods and engineering rules to remove erroneous peaks and duplicate values from the isolation resistance data, generating one or more isolation rules based on the isolation resistance data to represent thresholds for determining whether a loss of isolation has occurred for the RESS associated therewith, and identifying an isolation issue type for the RESSs determined to have the loss of isolation.

20 Claims, 8 Drawing Sheets

(56) References Cited

U.S. PATENT DOCUMENTS

| | | | | |
|---|---|---|---|---|
| 2023/0356624 | A1 * | 11/2023 | Jang | B60L 3/0046 |
| 2024/0168093 | A1 * | 5/2024 | Kong | G06N 5/01 |
| 2024/0248138 | A1 * | 7/2024 | Reiter | G01R 31/392 |
| 2025/0087029 | A1 * | 3/2025 | Zhang | G06Q 10/20 |
| 2025/0187443 | A1 * | 6/2025 | Neuman | G01R 31/12 |

* cited by examiner

RECHARGEABLE ENERGY STORAGE SYSTEM ISOLATION DETECTION

INTRODUCTION

The present disclosure relates to detecting isolation for a rechargeable energy storage system (RESS), such as but not necessarily limited to determining a loss of isolation for a RESS included onboard a vehicle to store and supply electrical power for a traction motor.

A rechargeable energy storage system (RESS) may be configured for storing and supplying electrical power, with one of the more common types of RESSs including a plurality of battery cells arranged into one or more battery packs. Such RESSs may be included onboard a vehicle to store and supply electrical power for a traction motor operable for converting the electrical power to mechanical power for purposes of propelling the vehicle. To achieve desired levels of operation, it may be advantageous to electrically isolate one or more of the battery packs from another one or more of the battery packs. Because of the advantages associated with maintaining electrical isolation, it may be desirable to detect when a loss of the electrical isolation may have occurred or may be likely to occur so that corrective action may be taken.

SUMMARY

One non-limiting aspect of the present disclosure relates to detecting a loss of isolation for a rechargeable energy storage system (RESS). The systems and methods described herein may be operable for detecting a loss of isolation for a wide variety of RESSs, including RESSs of the type having a plurality of battery cells arranged into one or more battery packs to store and supply electrical power for a traction motor of a vehicle. The loss of isolation may be determined based on systematic processes for monitoring and tracking isolation resistance signals to predict a loss of isolation using statistical models, machine learning, and/or physics-based algorithms for isolation loss prediction and isolation type identification.

One non-limiting aspect of the present disclosure relates to a system to detect/predict high voltage battery pack isolation loss and provide isolation type identification. The system may utilize RESS isolation resistance, temperature, and/or a combination of features to enable accurate detection, identification, and robust to noise resistance determinations based on a variety of factors. The system may monitor a fleet of vehicles to learn nominal bounds, signature patterns sufficient to isolate between coolant leak/water intrusion and cell corrosion, to provide insights on isolation causes, to monitor isolation loss progression and send proactive alerts/notifications to warn customers ahead of time, and/or to manage vehicle operation. The system may optionally be implemented using a passive approach such that attendant detection may occur while the vehicle is in operation and optionally without impacting driving.

One non-limiting aspect of the present disclosure relates to a system for assessing loss of isolation for a rechargeable energy storage systems (RESS). The system may include a data collection module configured for determining isolation resistance data for a plurality of RESSs operating onboard a fleet of vehicles, optionally with the RESSs configured to store and supply electrical power for a traction motor of the vehicle associated therewith. The system may further include an intelligent filtering and reprocessing module configured for applying statistical methods and engineering rules to remove erroneous peaks and duplicate values from the isolation resistance data. The system may further include a prognostic module configured for generating isolation rules from healthy data included with the isolation resistance data, optionally with the isolation rules operable assessing whether the isolation resistance data is representative of a loss of isolation. The system may further include an assessment module configured for characterizing each loss of isolation.

The prognostic module may be configured for generating the isolation rules to include thresholds for determining whether the loss of isolation has occurred.

The assessment module may be configured for applying the isolation rules to the isolation resistance data to identify an isolation issue type for the RESSs determined to have the loss of isolation.

The assessment module may be configured for determining the isolation issue type to correspond with a water intrusion event when the isolation resistance data exceeds a water intrusion resistance signature included as one of the isolation rules.

The assessment module may be configured for determining the isolation issue type to correspond with a cell corrosion event when the isolation resistance data exceeds a cell corrosion resistance signature included as one of the isolation rules.

The intelligent filtering and reprocessing module may be configured for performing a multiple pack processing, optionally with the multiple pack processing removing the isolation resistance data associated with each RESS having multiple packs showing similar erroneous behavior.

The prognostic module may be configured for performing distribution fitting and threshold learning to generate control limits and prognostic thresholds for the fleet.

The assessment module may be configured for employing a severity index and a severity assessment to determine a severity and provide an early warning to a customer of each vehicle having the loss of isolation.

The system may include an alert module configured for transmitting an alert to an operating system onboard each vehicle to be provided the early warning.

The alert module may be configured for generating the alert to include instructions to request an operator to service the vehicle associated therewith.

The alert module may be configured for generating the alert to notify an operator of the vehicle associated therewith that a shutdown command has been issued to prevent further use of the RESS associated therewith.

One non-limiting aspect of the present disclosure relates to a method for assessing loss of isolation for a rechargeable energy storage systems (RESS). The method may include collecting isolation resistance data for a plurality of RESSs operating onboard a fleet of vehicles, optionally with each RESS operating onboard a vehicle to store and supply electrical power for a traction motor, applying statistical methods and engineering rules to remove erroneous peaks and duplicate values from the isolation resistance data, generating one or more isolation rules based on the isolation resistance data, optionally with the isolation rules representing thresholds for determining whether a loss of isolation has occurred, applying the isolation rules to the isolation resistance data to identify one or more of the RESSs having an isolation issue, and identifying an isolation issue type for the RESSs determined to have the isolation issue.

The method may include determining the isolation issue type to correspond with a water intrusion event when the isolation resistance data exceeds a water intrusion resistance signature included as one of the isolation rules.

The method may include determining the isolation issue type to correspond with a cell corrosion event when the isolation resistance data exceeds a cell corrosion resistance signature included as one of the isolation rules.

The method may include deriving graphical representations of the isolation resistance data as signatures operable to correspondingly represent operations of the RESSs operating in a healthy manner and an unhealthy manner.

The method may include performing peak filtering on the isolation resistance data according to engineering rules to remove erroneous peaks from the graphical representations.

The method may include transmitting an alert to an operating system onboard one or more of the vehicles determined to have the isolation issue.

The method may include including instructions in the alert to request an operator to service the vehicle associated therewith.

The method may include including instructions in the alert to notify the operator that a shutdown command has been issued to prevent further use of the RESS associated therewith.

One non-limiting aspect of the present disclosure relates to a system for assessing loss of isolation for rechargeable energy storage systems (RESSs). The system may include a data collection module configured for determining isolation resistance data for a plurality of RESSs, optionally with the RESSs configured to store and supply electrical power for a traction motor of a vehicle associated therewith. The system may further include an intelligent filtering and reprocessing module configured for generating filtered isolation resistance data by applying statistical methods and engineering rules to remove erroneous peaks and duplicate values from the isolation resistance data. The system may further include a prognostic module configured for generating a water intrusion signature and a cell corrosion signature based on the filtered isolation resistance data, optionally with the water intrusion signature representing characteristics associated with a water intrusion type of isolation loss and the cell corrosion signature representing characteristics associated with a cell corrosion type of isolation loss, and determining whether a loss of isolation has occurred for one or more of the RESSs based at least in part on determining whether the water intrusion and/or cell corrosion signatures match with the isolation data associated therewith.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
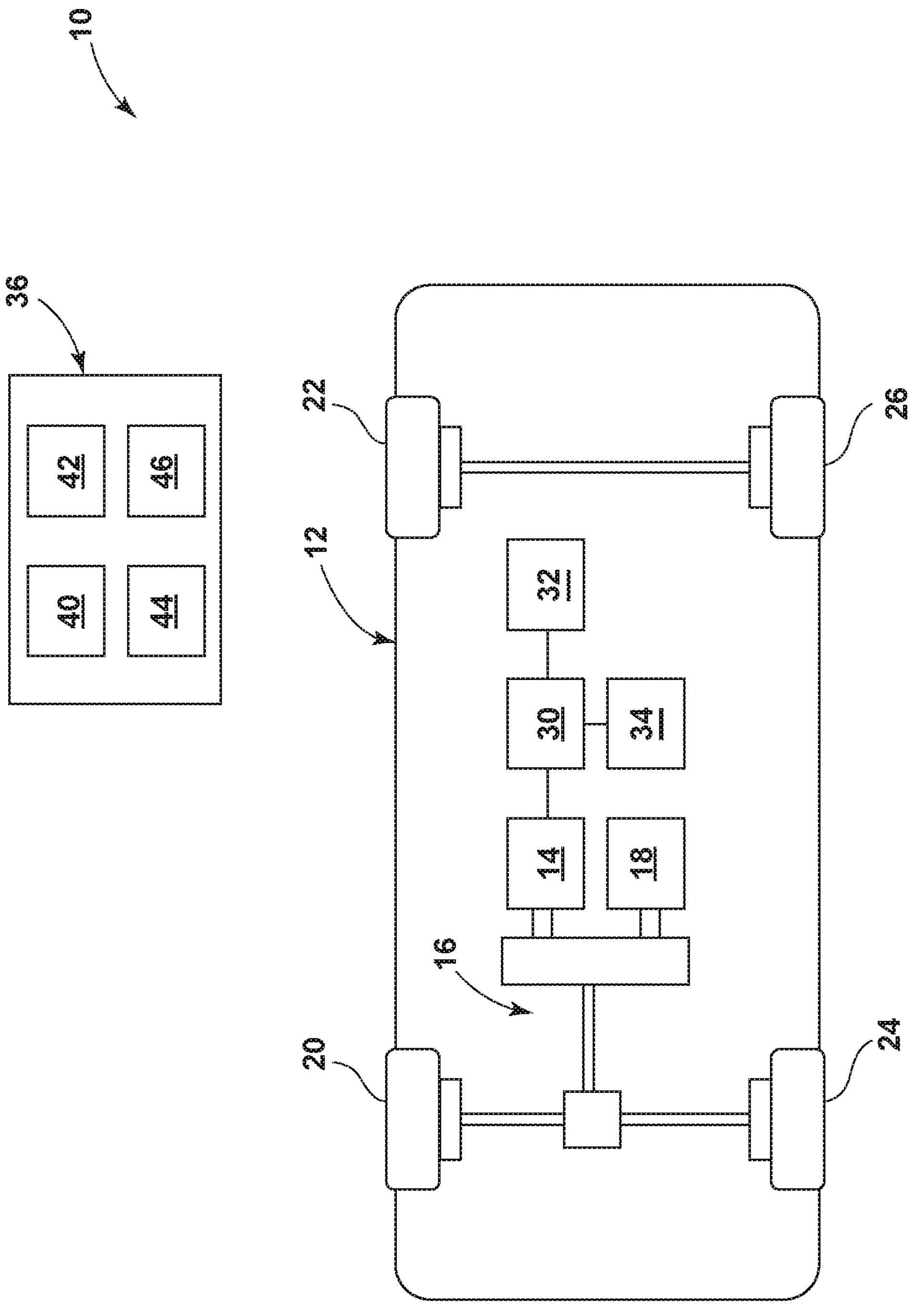
FIG. 1 illustrates a system for detecting loss of isolation in accordance with one non-limiting aspect of the present disclosure.

FIG. 1 illustrates a system 10 for detecting loss of isolation in accordance with one non-limiting aspect of the present disclosure. The system 10 may be operable with a fleet of vehicles, which may include a plurality of related and/or unrelated vehicles similar to a vehicle 12. The vehicle 12, which may be interchangeable referred to as an electric or hybrid vehicle 12, may include an electric motor 14 operable for converting electrical power to mechanical power for purposes of performing work, such as to mechanically power a drivetrain 16 to propel the vehicle. The vehicle 12 is illustrated as a hybrid type due to the powertrain 16 optionally including an internal combustion engine (ICE) 18 for generating mechanical power. The powertrain 16 may include componentry to facilitate conveying rotative force from the electric motor 14 to one or more of the wheels 20, 22, 24, 26. The vehicle 12 may include a rechargeable energy storage system (RESS) 30 for storing and supplying electrical power for the electric motor 14 and/or other system, buses, etc. connected to one or more electrical buses 32 onboard the vehicle 12. The RESS 30 may include a plurality of battery cells or other storage energy storage units arranged to a plurality of battery packs or other unit groupings. It may be desirable to detect isolation between one or more battery packs and another one or more battery packs of the RESS 30, which may be based on assessing whether electrical isolation between one or more battery packs may be degraded, lost, or likely to be disrupted in a manner that may result in the RESS 30 and/or the vehicle 12 operating differently than intended.

The vehicle 12 may include a vehicle controller 34 to facilitate monitoring, controlling, measuring, and otherwise directing operation, performance, etc. onboard the vehicle 12, which may include performing measurements, taking readings, or otherwise collecting RESS data from the RESS 30. The system 10 may include an isolation detection controller 36 at a back office or other location operable for communicating with the fleet of vehicles 12, such as via wireless signal exchange with corresponding controllers 34. The isolation detection controller 36 may be configured for performing a wide variety of operations, processes, etc. to facilitate the loss of isolation detection contemplated herein. The isolation detection controller 36 and the vehicle controller 34 may each operate based on and/or according to a corresponding one or more processors executing a corresponding plurality of non-transitory instructions stored on an associated computer-readable storage medium. The non-transitory instructions may be executable for purposes of communicating messages, executing software or other algorithms, performing calculations, and otherwise facilitating exchange of data with the vehicles 12 to perform the various activities described herein to detect loss of isolation. The operation of the isolation detection controller 36 may be allocated to a data collection module 40, an intelligent filtering and reprocessing module 42, a prognostic module 44, and an assessment module 46.

Figure 2:
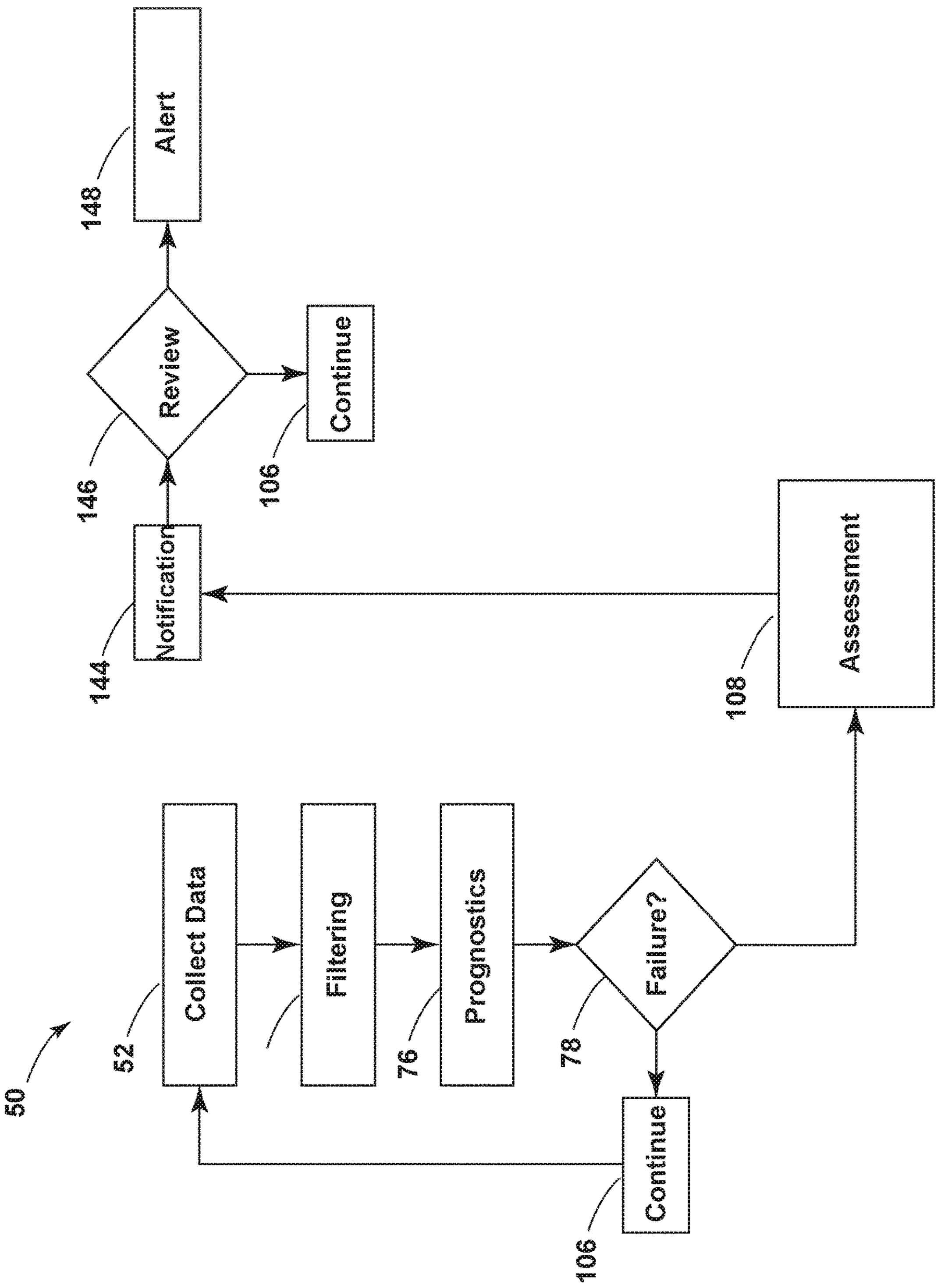
FIG. 2 illustrates a flowchart of a method for detecting a loss of isolation in accordance with one non-limiting aspect of the present disclosure.

FIG. 2 illustrates a flowchart 50 of a method for detecting a loss of isolation in accordance with one non-limiting aspect of the present disclosure. Block 52 relates to a collection process whereby the data collection module 40 may determine RESS data, or more specifically, isolation resistance data for a plurality of RESSs operating on board the fleet of vehicles 12. The isolation resistance data may be based on the vehicle controllers 34 utilizing sensors or other features onboard the vehicle 12 to measure or otherwise assess isolation resistance associated with the RESS 30 and/or the battery packs. The isolation resistances, for example, may be based on measuring input and output voltages of the battery packs and/or the entirety of the RESS 30 and utilizing characteristics of the associated battery packs to estimate the isolation resistance from the measured voltages. This may include the vehicle controller 34 generating isolation related signaling for communication to the isolation detection controller 36, which may optionally include making adjustments to the isolation resistance estimates to account for temperature and/or other influencing factors. The data collection module 40 may be configured for calculating the isolation resistances in addition to or instead of the vehicle controller 34. The resulting isolation resistance data may include vehicle identifiers, RESS identifiers, and/or other information to relate the individual isolation resistances to a particular vehicle so that a customer, entity, etc. associated with the vehicle may be determined.

Figure 3:
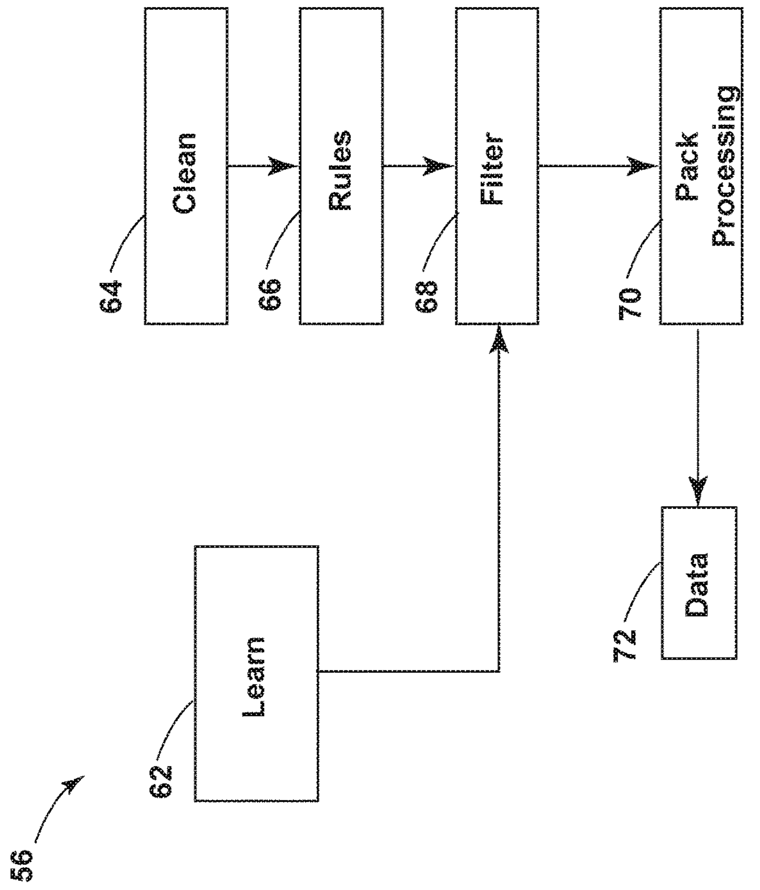
FIG. 3 illustrates a flowchart of a filtering process in accordance with one non-limiting aspect of the present disclosure.

Block 54 relates to a filtering process whereby the intelligent filtering and reprocessing module 42 may apply statistical methods and engineering rules to remove erroneous peaks and/or duplicate values from the isolation resistance data. The filtering process may include the intelligent filtering and reprocessing module 42 receiving the isolation resistance data from the data collection module 40 and processing the isolation resistance data into filtered isolation resistance data having duplicate values, erroneous peaks, etc. removed. FIG. 3 illustrates a flowchart 56 of the filtering process in accordance with one non-limiting aspect of the present disclosure. Block 62 relates to a learning process whereby the intelligent filtering reprocessing module 42 may apply statistical methods to learn acceptable noise levels for the isolation resistance data. Block 64 relates to a cleaning process whereby the intelligent filtering reprocessing module 42 may remove default, erroneous, and duplicate values from the isolation resistance data. Block 66 relates to an engineering rules process whereby the intelligent filtering and reprocessing module 42 may apply engineering rules to remove erroneous peaks. Block 68 relates to a refinement process for applying signal processing techniques and the learned noise levels to filter the signals, i.e., the isolation resistance data. Block 70 relates to a multiple pack process whereby the isolation resistance data associated with each RESS having multiple packs showing similar erroneous behavior may be removed. Block 72 relates to generating the filtered isolation resistance data, i.e., outputting the isolation resistance data after removing erroneous peaks, duplicate values, etc.

Figure 4:
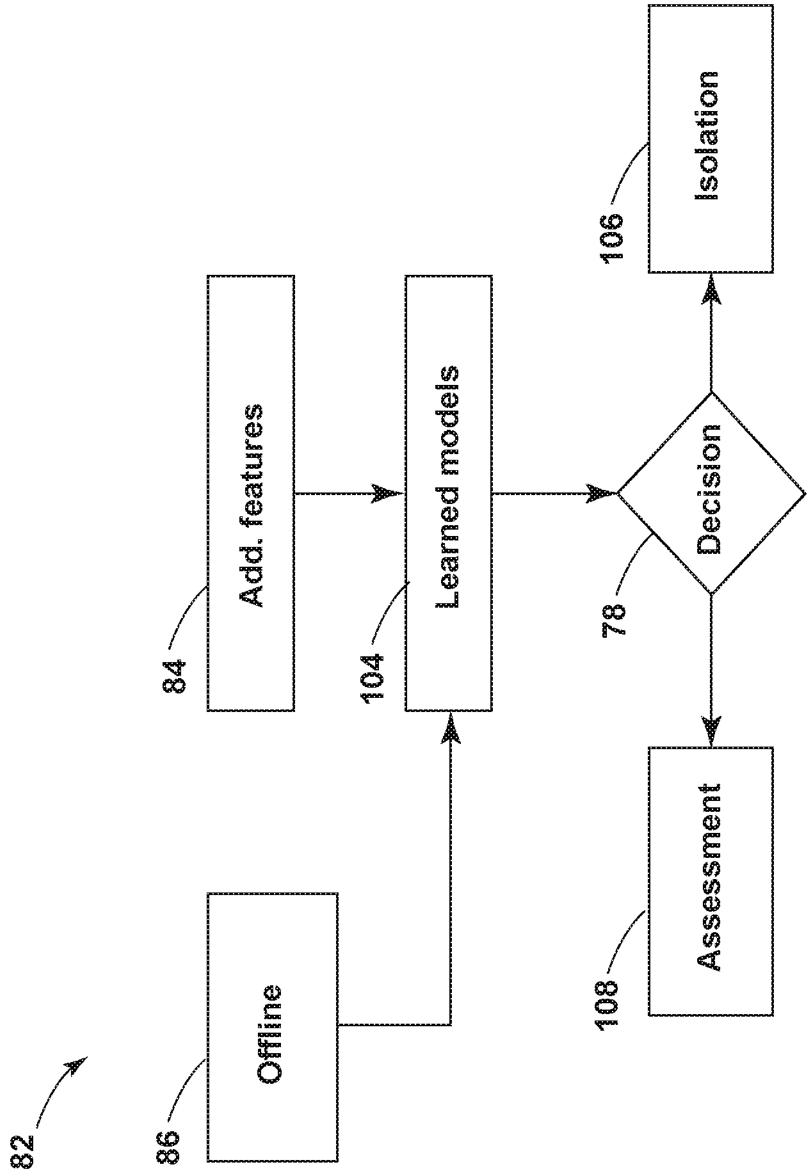
FIG. 4 illustrates a flowchart of a prognostic process in accordance with one non-limiting aspect of the present disclosure.

Returning to FIG. 2, Block 76 may relate to a prognostic process whereby the prognostic module 44 may generate isolation rules from healthy data included with the filtered isolation resistance data. The isolation rules may be operable assessing whether the isolation resistance data is representative of a loss of isolation for the RESS 30 associated therewith. The prognostic process may be operable to identify healthy data and unhealthy data included with the filtered isolation resistance data based on the healthy data being identified with the RESSs 30 operating in a healthy manner and the unhealthy data being identified with the RESSs 30 operating in an unhealthy manner. The prognostic process may include generating the isolation rules to include thresholds for determining whether the loss of isolation has occurred in Block 78. FIG. 4 illustrates a flowchart 82 showing more detail for the prognostic process in accordance with one non-limiting aspect of the present disclosure. Block 84 may relate to an additional features process whereby the prognostic module 44 may derive additional features from the isolation resistances (e.g., moving window-based avg resistance value ($r_a$), slope, rate of change of slope, etc.), optionally with added temperature compensation when necessary. Block 86 may relate to an offline learning process whereby the prognostic module may use the healthy data (e.g., the RESSs data without leaks/loss of isolation) and the unhealthy data (e.g., the RESSs data with leaks/loss of isolation) to learn nominal model and detection threshold or outlier decision boundary.

Figure 5:
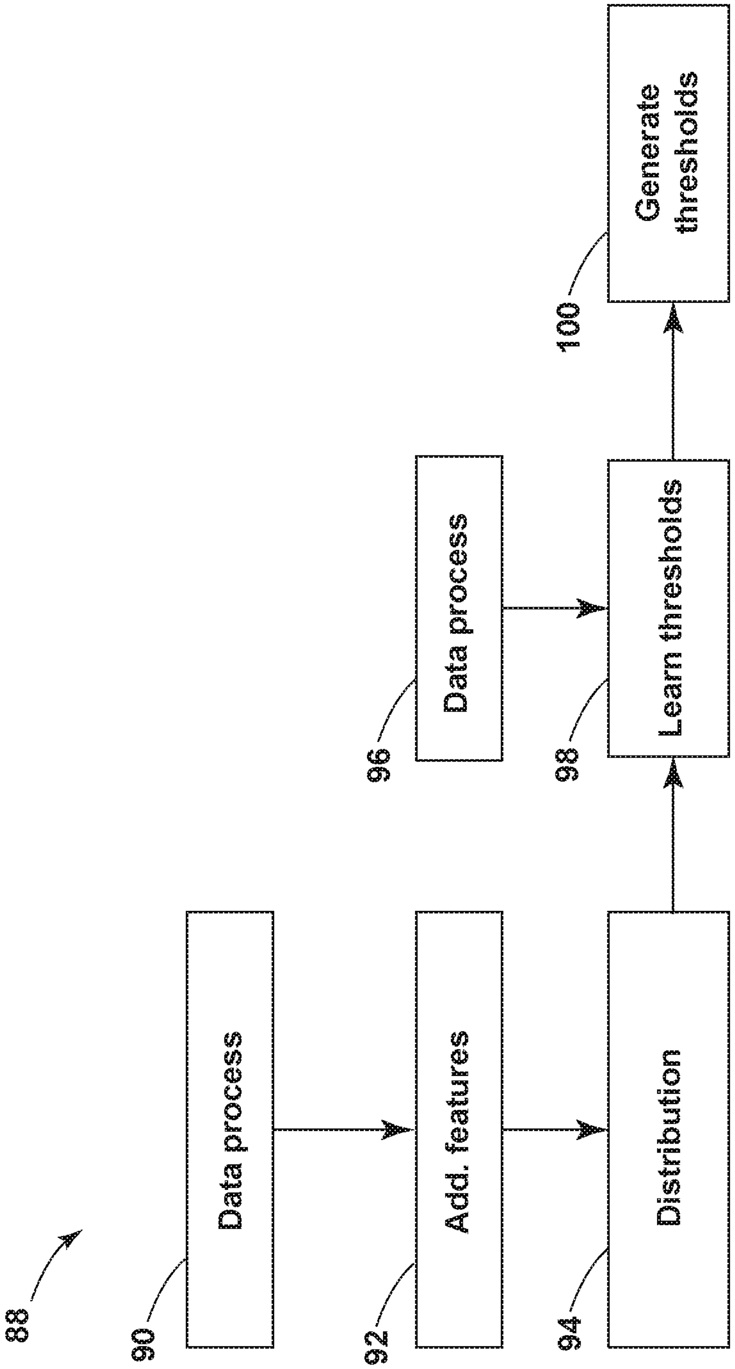
FIG. 5 illustrates a flowchart of the offline learning process in accordance with one non-limiting aspect of the present disclosure.

FIG. 5 illustrates a flowchart 88 of the offline learning process in accordance with one non-limiting aspect of the present disclosure. Block 90 relates to a data process for identifying the healthy RESS data, such as based on the filtered isolation resistance data. Block 92 relates to an additional features process whereby the prognostic module 44 may derive additional features from smooth resistances, slope, rate of change of slope, etc. for the isolation resistance data. Block 94 relates to a distribution fitting in parameter learning process whereby the prognostic module may determine when little to no bimodality may be observed to use bootstrapping to generate distributions, in case of distributions with multi-modality to fit using Kernel Density Estimation, and/or to set up control limits using population statistics. Block 96 relates to a data process for identifying the unhealthy RESS data, such as based on the filtered isolation resistance data. Block 98 relates to a learn thresholds process whereby the prognostic module may find the thresholds used to determine isolation issues via an optimization problem, e.g., maximize true positives, and minimize false positives (e.g., Gini impurity score), or engineering rules based on best performing unacceptable part. Alternatively or additionally, Interquartile Range (IQR) could be used to set up the thresholds (or) a machine learning (ML) algorithm could be trained to detect anomalous patterns. This manner, the present disclosure contemplates building nominal models for detecting isolation or a loss of isolation for the battery packs based on multiple approaches, which may include using one or more of the following to detect loss of isolation: physics based methods (engineering derived rules), statistical methods, distribution fitting and application of 6-sigma rules, signal-based outlier detection (statistical IQR), and/or artificial intelligent (AI)/ML-based (e.g., one class Support Vector Machine (SVM)). Block 100 relates to an output process whereby the prognostic module may generate thresholds or other rules for use in comparing to the fleet of vehicles to detect isolation.

Returning to FIG. 4, Block 104 relates to an application process whereby the prognostic module may apply learned nominal models to detect and confirm loss of isolation and/or to identify the type of isolation issue. The process may include determining a loss of isolation if resistance features are above the threshold or outside nominal boundary and/or if the issue is present for 'n' consecutive samples/trips. In addition to or alternatively, the process may include performing a moving window-based aggregation to determine whether issue exists for m consecutive windows. The process may be performed on a vehicle-by-vehicle basis whereby each of the RESS data collected from each of the vehicles may be analyzed such that a decision therefore may be performing in Block 78 with respect to whether an issue has been detected and confirmed. Block 106 may relate to determining the isolation to be suitable such that monitoring may continue for the corresponding vehicle. Block 108 may relate to determining an issue with the isolation, such as an existing or predicted loss of isolation. Returning to FIG. 2, and issue determination may result in the prognostic module providing related information, RESS data, isolation data, etc. to the assessment module 108 for further analysis.

Figure 6:
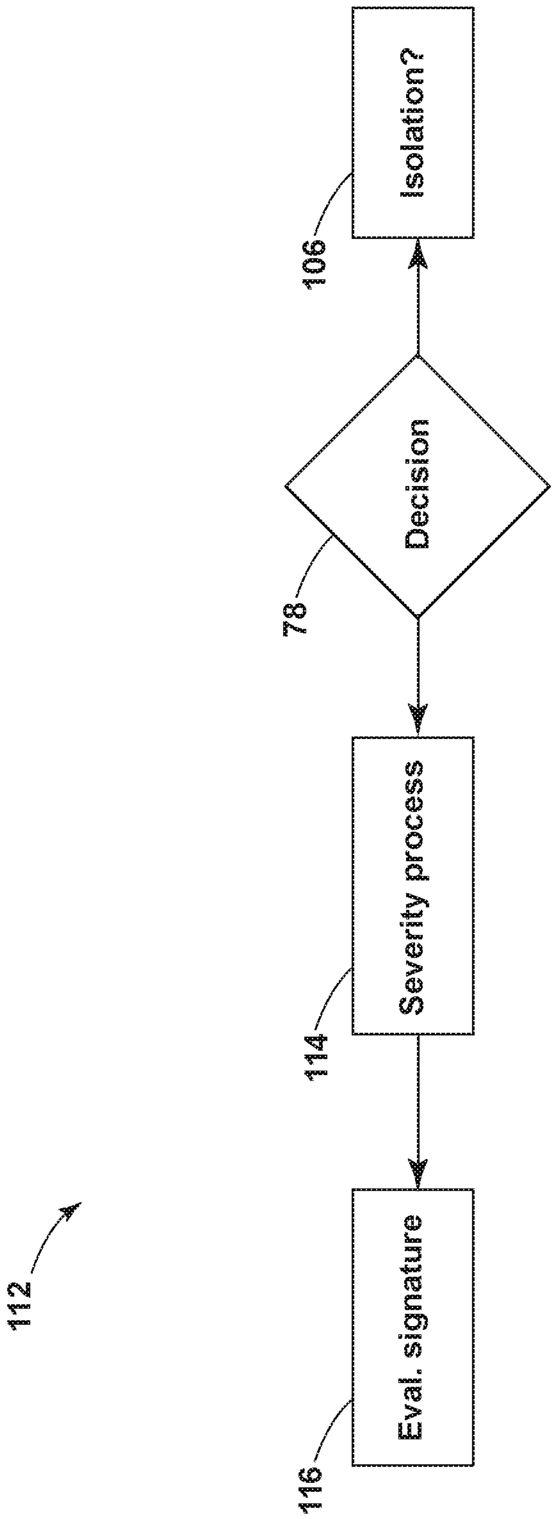
FIG. 6 illustrates a flowchart of an assessment process in accordance with one non-limiting aspect of the present disclosure.
Figure 7:
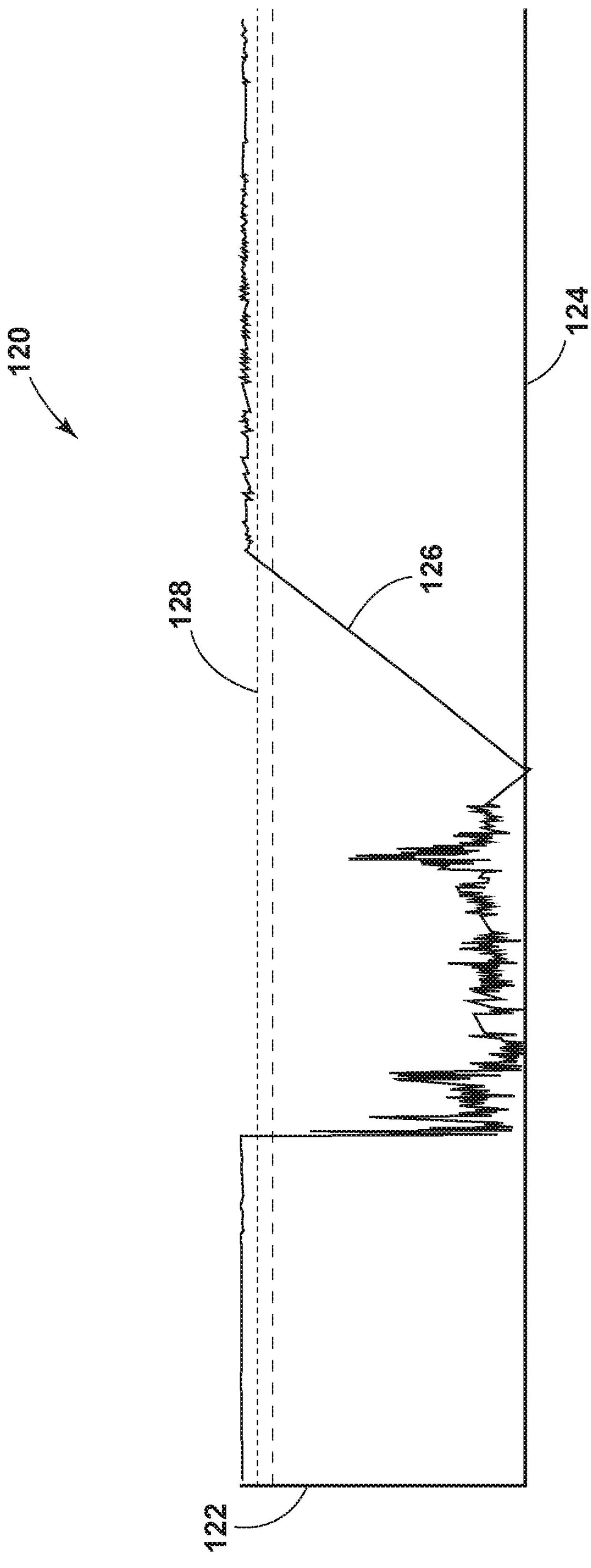
FIG. 7 illustrates a graph of a water intrusion type of issue in accordance with one non-limiting aspect of the present disclosure.
Figure 8:
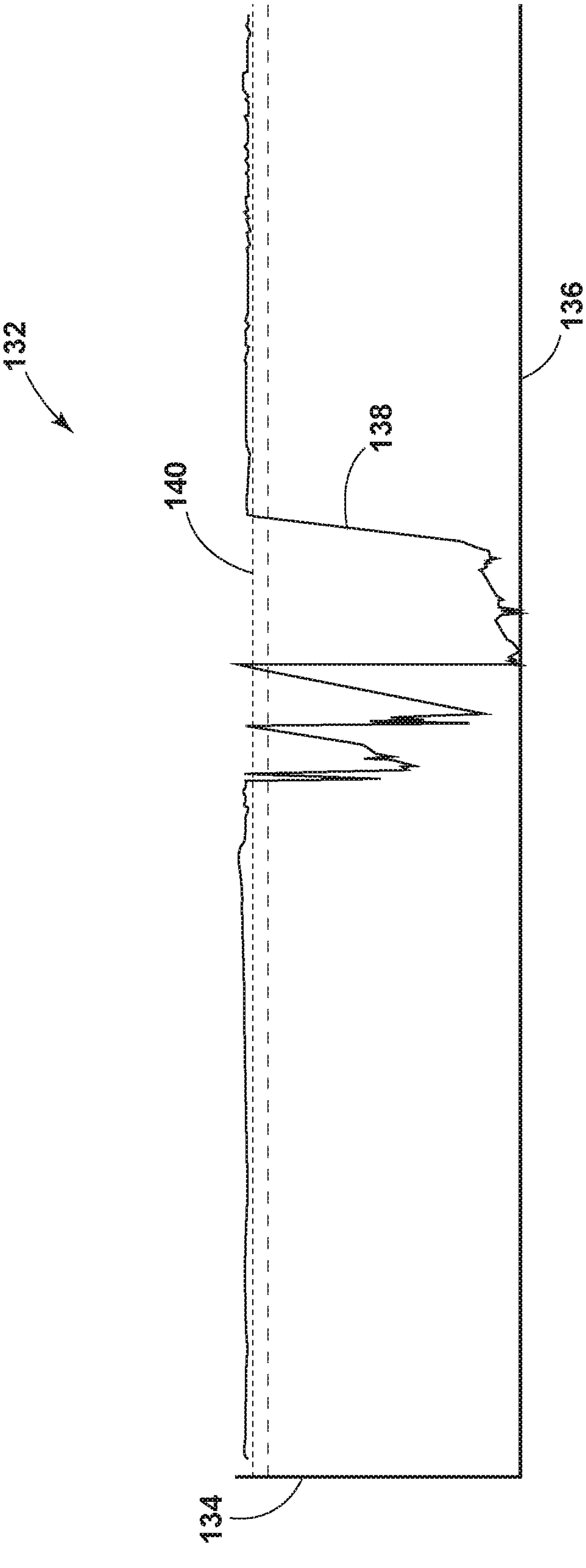
FIG. 8 illustrates a graph a cell corrosion type of issue in accordance with one non-limiting aspect of the present disclosure.

FIG. 6 illustrates a flowchart 112 of an assessment process in accordance with one non-limiting aspect of the present disclosure. The assessment process may be performed by the assessment module 46 in response to the information provided from the prognostic module for one or more detected isolation issues. Block 114 relates to an evaluate severity process whereby the assessment module perform a severity assessment for the detected isolation issue. The process may include determining how far the signals of one of the vehicle may be away from the fleet median, and based thereon, relate that difference relative to the threshold to quantify low, medium, high severity or count the quantity of instances, i that the issue is detected in a window size w, such as if i=10, the worst case may corresponding with i=10 and the least concern may corresponding with i=1. Block 116 relates to an evaluate signature pattern process whereby the assessment module may apply the isolation rules to the isolation resistance data to identify an isolation issue type for the RESSs determined to have the loss of isolation. The assessment module may be configured for determining the isolation issue type to correspond with a water intrusion event when the isolation resistance data exceeds a water resistance signature included as one of the isolation rules, such as according to a graph 120 of the water intrusion resistance signature shown in FIG. 7. The graph 120 may include a vertical axis 122 representing isolation resistance and a horizontal axis 124 representing time such that a water intrusion type of issue may coincide with a signal 126 representing isolation resistance dipping quickly or gradually and remaining below a normal or nominal level 128. The assessment module 44 may be configured for determining the isolation issue type to correspond with a cell corrosion event when the isolation resistance data exceeds a cell corrosion resistance signature included as one of the isolation rules, such as according to a graph 132 of the cell corrosion isolation resistance signature shown in FIG. 8. The graph 132 may include a vertical axis 134 representing isolation resistance and a horizontal axis 136 representing time such that a cell corrosion type of issue may coincide with a signal 138 representing isolation resistance dips quickly and returns to a normal or nominal level 140 on a frequent basis.

Returning to FIG. 2, Block 144 may relate to a notification process whereby the alert module may generate a notification for transmission to engineering or other entities responsible for overseeing or otherwise working with the fleet of vehicles. Block 146 may relate to a review process whereby the notification may be analyzed to determine whether an alert to a customer, i.e., in order of the vehicle, and/or a manufacturer should be apprised of the isolation issue. Block 148 may relate to the alert module currently responding transmitting an alert to an operating system onboard each vehicle to be provided the early warning, which may include instructions to request an operator to service the vehicle associated therewith and/or to notify an operator of the vehicle associated therewith that a shutdown command has been issued to prevent further use of the RESS associated therewith.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for assessing loss of isolation for rechargeable energy storage systems (RESSs), comprising:

a data collection module on a controller configured for determining isolation resistance data for a plurality of RESSs operating onboard a fleet of vehicles, the RESSs configured to store and supply electrical power for a traction motor of the vehicle associated therewith, wherein the isolation resistance data is based on measuring input voltages and output voltages of battery packs of each of the plurality of RESSs;

an intelligent filtering and reprocessing module on the controller configured for applying statistical methods and engineering rules to remove erroneous peaks and duplicate values from the isolation resistance data;

a prognostic module on the controller configured for generating isolation rules from healthy data included with the isolation resistance data, the isolation rules operable for assessing whether the isolation resistance data is representative of a loss of isolation; and an assessment module on the controller configured for characterizing each loss of isolation, wherein the assessment module is configured for employing a severity index and a severity assessment to determine a severity and provide an early warning to a customer of each vehicle having the loss of isolation utilizing an alert module configured for transmitting an alert to an operating system onboard each vehicle to be provided the early warning.

2. The system according to claim 1, wherein:
the prognostic module is configured for generating the isolation rules to include thresholds for determining whether the loss of isolation has occurred.

3. The system according to claim 2, wherein:
the assessment module is configured for applying the isolation rules to the isolation resistance data to identify an isolation issue type for the RESSs determined to have the loss of isolation.

4. The system according to claim 3, wherein:
the assessment module is configured for determining the isolation issue type to correspond with a water intrusion event when the isolation resistance data exceeds a water intrusion resistance signature included as one of the isolation rules.

5. The system according to claim 4, wherein:
the assessment module is configured for determining the isolation issue type to correspond with a cell corrosion event when the isolation resistance data exceeds a cell corrosion resistance signature included as one of the isolation rules.

6. The system according to claim 1, wherein:
the intelligent filtering and reprocessing module is configured for performing a multiple pack processing, the multiple pack processing removing the isolation resistance data associated with each RESS having multiple packs showing similar erroneous behavior.

7. The system according to claim 1, wherein:
the prognostic module is configured for performing distribution fitting and threshold learning to generate control limits and prognostic thresholds for the fleet.

8. The system according to claim 1, wherein:
the alert module is configured for generating the alert to include instructions to request an operator to service the vehicle associated therewith.

9. The system according to claim 8, wherein:
the alert module is configured for generating the alert to notify an operator of the vehicle associated therewith that a shutdown command has been issued to prevent further use of the RESS associated therewith.

10. The system according to claim 1, wherein:
the prognostic module is configured for generating a moving window-based average resistance value, a slope, and a rate of change of the slope of the isolation resistance data.

11. The system according to claim 1, wherein:
the prognostic module is configured for performing an offline learning process utilizing healthy data from the isolation resistance data for RESSs without leak or loss of isolation and unhealthy data from the isolation resistance data for the RESSs with leak or loss of isolation to learn a nominal model and detection threshold for the loss of isolation.

12. A method for assessing loss of isolation for rechargeable energy storage systems (RESSs), comprising:
collecting isolation resistance data with a data collection module on a controller for a plurality of RESSs operating onboard a fleet of vehicles, each RESS operating onboard a vehicle to store and supply electrical power for a traction motor, wherein the isolation resistance data is based on measuring input voltages and output voltages of battery packs of each of the plurality of RESSs;
applying statistical methods and engineering rules with an intelligent filtering and reprocessing module on the controller configured for applying statistical methods and engineering rules to remove erroneous peaks and duplicate values from the isolation resistance data;
generating one or more isolation rules based on the isolation resistance data with a prognostic module on the controller, the isolation rules representing thresholds for determining whether a loss of isolation has occurred;
applying the isolation rules to the isolation resistance data to identify one or more of the RESSs having an isolation issue; and
identifying an isolation issue type with an assessment module on the controller for the RESSs determined to have the isolation issue, wherein the assessment module is configured for employing a severity index and a severity assessment to determine a severity and provide an early warning to a customer of each vehicle having the loss of isolation utilizing an alert module configured for transmitting an alert to an operating system onboard each vehicle to be provided the early warning.

13. The method according to claim 12, further comprising:
determining the isolation issue type to correspond with a water intrusion event when the isolation resistance data exceeds a water intrusion resistance signature included as one of the isolation rules.

14. The method according to claim 12, further comprising:
determining the isolation issue type to correspond with a cell corrosion event when the isolation resistance data exceeds a cell corrosion resistance signature included as one of the isolation rules.

15. The method according to claim 12, further comprising:
deriving graphical representations of the isolation resistance data as signatures operable to correspondingly represent operations of the RESSs operating in a healthy manner and an unhealthy manner.

16. The method according to claim 15, further comprising:
performing peak filtering on the isolation resistance data according to engineering rules to remove erroneous peaks from the graphical representations.

17. The method according to claim 12, further comprising:
including instructions in the alert to request an operator to service the vehicle associated therewith.

18. The method according to claim 12, further comprising:
including instructions in the alert to notify the operator that a shutdown command has been issued to prevent further use of the RESS associated therewith.

19. A system for assessing loss of isolation for rechargeable energy storage systems (RESSs), comprising:
a data collection module on a controller configured for determining isolation resistance data for a plurality of RESSs, the RESSs configured to store and supply electrical power for a traction motor of a vehicle associated therewith, wherein the isolation resistance data is based on measuring input voltages and output voltages of battery packs of each of the plurality of RESSs;

an intelligent filtering and reprocessing module on the controller configured for generating filtered isolation resistance data by applying statistical methods and engineering rules to remove erroneous peaks and duplicate values from the isolation resistance data; and a prognostic module on the controller and configured for:

generating a water intrusion signature and a cell corrosion signature based on the filtered isolation resistance data, the water intrusion signature representing characteristics associated with a water intrusion type of isolation loss and the cell corrosion signature representing characteristics associated with a cell corrosion type of isolation loss;

determining whether a loss of isolation has occurred for one or more of the RESSs based at least in part on determining whether the water intrusion and/or cell corrosion signatures match with the isolation data associated therewith; and an assessment module on the controller configured for characterizing each loss of isolation, wherein the assessment module is configured for employing a severity index and a severity assessment to determine a severity and provide an early warning to a customer of each vehicle having the loss of isolation utilizing an alert module configured for transmitting an alert to an operating system onboard each vehicle to be provided the early warning.

20. The system according to claim 19, wherein transmitting the alert includes notifying the operator that a shutdown command has been issued to prevent further use of the RESS associated therewith.

* * * * *